United States Patent
Coleman

[15] 3,649,744
[45] Mar. 14, 1972

[54] SERVICE ENTRANCE CABLE WITH PREFORMED FIBERGLASS TAPE

[72] Inventor: Neil Coleman, Highland Park, Ill.
[73] Assignee: Coleman Cable & Wire Co., River Grove, Del.
[22] Filed: June 19, 1970
[21] Appl. No.: 47,691

[52] U.S. Cl. .................. 174/107, 174/108, 174/113 R, 174/117 R, 174/124 GC
[51] Int. Cl. .................................................. H01b 7/18
[58] Field of Search ............ 174/115, 113, 107, 120, 121, 174/122, 124, 116, 108, 105, 117

[56] References Cited

UNITED STATES PATENTS

| 3,105,871 | 10/1963 | Eager, Jr. | 174/117 X |
| 2,930,837 | 3/1960 | Thompson | 174/115 |
| 1,946,190 | 2/1934 | Brodhun | 174/108 X |
| 3,060,261 | 10/1962 | Stanley et al. | 174/106 X |
| 2,718,544 | 9/1955 | Shepp | 174/113 |
| 240,772 | 4/1881 | Schinneller | 174/120 |
| 2,922,835 | 1/1960 | Lehr | 174/105 |

OTHER PUBLICATIONS

Glass Tapes For industrial Electrical Insulation Applications

*Primary Examiner*—Lewis H. Myers
*Assistant Examiner*—A. T. Grimley
*Attorney*—Fitch, Even, Tabin & Luedeka

[57] ABSTRACT

A service entrance cable having two or more insulated conductors and a neutral conductor and including a layer of fiberglass tape spirally wound and surrounding the entire bundle formed by the conductors. The entire cable, including the spiral wrapping, is encased in a polyvinyl chloride jacket. The cable is formed by aligning the conductors and spirally wrapping the fiberglass tape while moving the cable in a first longitudinal direction along its axis and extruding the polyvinyl chloride jacket over the layer of fiberglass tape while moving the cable in the opposite direction.

5 Claims, 4 Drawing Figures

PATENTED MAR 14 1972 3,649,744

SERVICE ENTRANCE CABLE WITH PREFORMED FIBERGLASS TAPE

The present invention relates to service entrance cables and, more particularly, is directed to improved service entrance cables and a method of manufacturing such cables.

Service entrance cables are employed in the electrical power industry for power lead-ins to buildings and other installations from the main powerlines. Accordingly, such cables often span considerable distances either hung by their two terminal points in catenary fashion or layed underground. In these types of service the cable may be subjected to repeated flexural and tension loads which in turn subject the components to considerable tensile stress and abrasion. In order to assure the complete safety of service entrance cables and other cables of this type in the electrical industry, the cables are typically submitted to Underwriters Laboratories for electrical and mechanical testing to determine their suitability for the type of environment and use for which they are intended. Underwriters Laboratories generally tests such cable for resistance to crushing, impact and abrasion on the finish as well as performing what is commonly known in the art as pull tests, flame tests and dielectric strength tests.

Recent prior art service entrance cables typically include a plurality of insulated conductors groups with an uninsulated neutral conductor in either a parallel straight line or a spiral bundle. The bundle is then surrounded by a braided sheath of fiberglass roving which in turn is surrounded by an extruded jacket or sheath of insulative protective material such as polyvinyl chloride. The fiberglass roving is braided onto the conductor bundle by conventional braiding machinery as the cable is passed therethrough.

Such prior art cables suffer several limitations in their manufacture and structure resulting in considerable loss of manufacturing time or "slow down" in the making of such finished cable, contributing to increased costs and inefficiency. Among these deficiencies is the fact that while the inner or remaining portions of the cable can be formed into a bundle at a relatively high speed, the braiding or weaving of the fiberglass sheath directly onto the surface of the conductor bundle is necessarily an extremely slow operation. In such an operation, the individual spools are moved orbitally at high speed about the slowly moving conductor bundle in "maypole" fashion to form the desired braid thereon, and the mechanical limitations on the speed of the spools as they interweave and orbit about the bundle limit the speed of the conductor bundle to permit the braiding. To perform this braiding operation, elaborate and expensive orbital braiding equipment must be employed to braid the sheath onto the surface of the conductor bundles. An additional drawback to the prior art cable is that often the roving from which the sheath is formed becomes frayed and tends to bunchup on the outside of the conductor bundle. As a result when the cable is processed through an extruding die to form the polyvinyl chloride outer jacket, any irregularities or frayed ends on the woven fiberglass sheath catch on the extruding die causing a pealing back of the fiberglass sheath and a consequent shutdown of the machinery.

The present invention provides a service entrance cable meeting all the safety and structural requirements of the Underwriters Laboratories while avoiding the problems created by the woven fiberglass sheath. The result is improved rates and efficiency of manufacture with attendant reductions in manufacturing costs, and improved reliability of the cable which is free of discontinuities in the fiberglass sheath.

It is an object of the present invention to provide an improved service entrance cable.

It is a further object of the present invention to provide a service entrance cable having a helically wrapped layer of fiberglass material surrounding the bundle formed by the conductors.

It is still a further object of the present invention to provide an improved method for the manufacture of service entrance cable.

These and other objects of the present invention will become evident in connection with the following detailed description and drawings in which.

Figure 1:
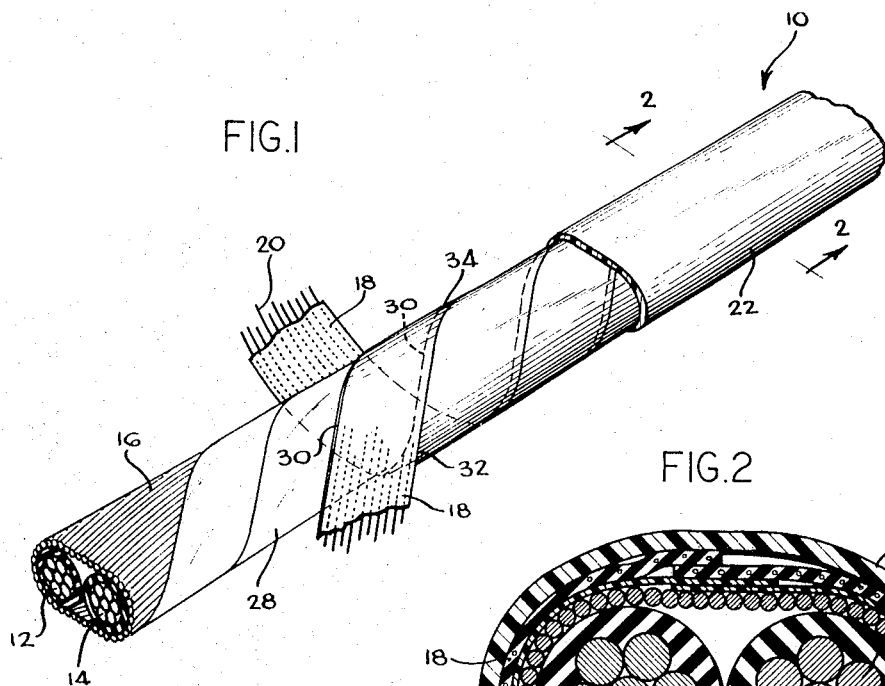
FIG. 1 is a perspective view of one embodiment of the present invention having portions of the outer layers of material removed for clarity.

The embodiment illustrated in FIG. 1 shows a service entrance cable 10 which includes a pair of insulated conductors 12 and 14 adapted to be used as the hot conductors, and a helically would neutral conductor 16, which is wound about the central axis of the cable and encases the two conductors 12 and 14 to form a bundle. A fiberglass tape 18 is spirally wound overlying the neutral conductor 16. In the illustrated embodiment of FIG. 1, the tape 18 is in the form of parallel strands (i.e., of roving 20 encased in a layer (or layers) of neoprene rubber (i.e., a synthetic rubberlike plastic formed by the polymerization of chloroprene) to form a flat tape. THe tape 18 is applied as a double lead spiral and each turn of the tape slightly overlaps the previously applied turn to form a continuous layer of tape around the bundle formed by the conductors 12 and 14 and the neutral conductor 16. The resulting assembly is encased in a continuous jacket 22 of flexible insulating material, such as polyvinyl chloride, which forms the outer layer of the finished service entrance cable.

Figure 2:
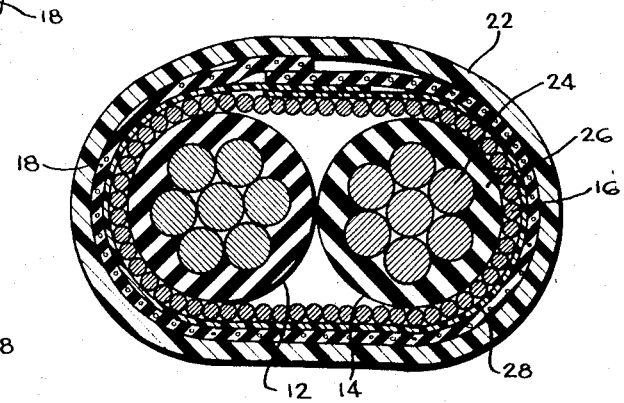
FIG. 2 is a sectional view taken along line 2—2 of FIG. 1.

Referring specifically to FIG. 2, the embodiment of FIG. 1 can be seen in more detail. Each of the insulated conductors 12 and 14 is conventional and is made up of a plurality of discrete, uninsulated wires or strands 24 formed into a conventional stranded conductor surrounded by a layer of insulation 26. Solid conductors could also be employed within the scope of the present invention; however, stranded conductors provide added cable flexibility which is desirable, especially for larger wire sizes. The insulation 26 may be of any suitable material including various synthetic rubbers and plastics and may include cross-linked polyethylene which is impervious to moisture. The insulating conductors 12 and 14 are positioned side by side in parallel fashion with their insulations in contact.

The neutral conductor 16 is conventionally formed of a series of discrete uninsulated wires which are helically would into an oval surrounding the two conductors 12 and 14, and such a neutral conductor is commonly known in the art as a "spiral neutral". In order to maintain the cable at as small a diameter as possible, the neutral conductor 16 is applied in the embodiment of FIG. 2 in the form of a single layer of wires positioned side by side in a helix extending along the service entrance cable. The two insulated conductors 12 and 14 together with the neutral conductor 16 form what will be referred to herein as the conductor bundle of the cable.

A thin layer of plastic tape, 28 such as polyethylene terephthalate (known under the trademark "Mylar"), also helically wound onto the cable, is positioned in overlying contact with the neutral conductor and forms a moisture impervious envelope or dam for the entire conductor bundle. The use of such a moisture impervious tape may be optional in certain constructions depending on the particular materials employed.

Additionally, individual polyethylene terephthalate tape wraps (not shown) may be employed about each of the insulated conductors 12 and 14, depending on the particular insulating material utilized for the insulation 26. For example, if the insulation of these conductors is formed by cross-linked polyethylene, such Mylar wraps may be dispensed with. However, where rubber is employed for the insulation 26, the use of such Mylar wraps may be desirable.

Figure 4:
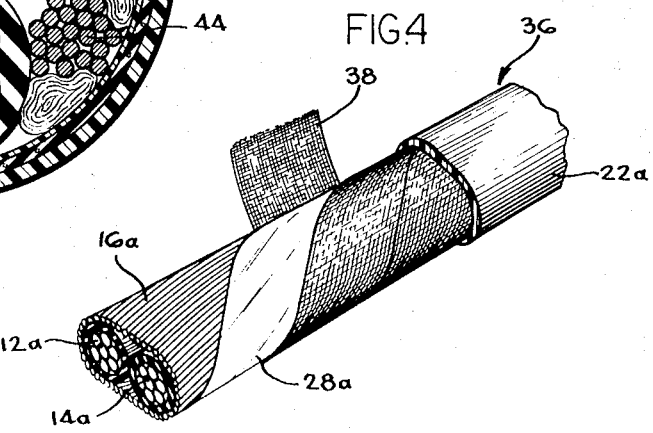
FIG. 4 is a perspective view with the outer layers partially broken away of still another embodiment of the present invention.

The fiberglass 18 is the embodiment of FIG. 1 is in the form of a flexible rubberlike tape of material such as neoprene having parallel rovings of fiberglass running lengthwise in the tape (shown partially dotted) and is helically wrapped on the conductor bundle overlying the Mylar tape. In the embodiment of FIG. 4 a woven tape is employed as will be described hereinafter.

The purpose of the fiberglass tape in a cable of the service entrance type is a multiple one. FIrst of all, it serves as a fire retarding wall for the cable and, in addition, it provides improved resistance to crushing and abrasion while retaining the ability of the cable to be as flexible as possible. For purposes of service entrance cable wrapping, the tape is approximately 2 inches in width, 10 mils thick and employs commercially available roving.

As can best be seen from FIG. 1, the tape is wound in a double lead helix in order to increase the production rate. It could also, as will be described hereinafter with respect to the embodiment of FIG. 4, be wound as a single lead helix without departing from the scope of the invention. In wrapping the fiberglass tape the leading edge of the tape 30 is placed directly onto the surface of the Mylar tape 28 while the trailing edge 32 is placed in slightly overlapping relationship with the leading edge of the previous turn of the helix. The result of this overlapping is a slightly raised portion 34 at the point of overlap. One reason for this overlapping wrap will become apparent hereinafter in connection with the description of the process for making the cable.

The outer jacket 22 is formed of extruded plastic, for example, polyvinyl chloride. The purpose of the jacket 22 is to provide a relatively weather impervious outer jacket which is not subject to cracking at low temperatures and which is strong enough to maintain the physical integrity of the cable under low temperature conditions. The nominal thickness of such a polyvinyl chloride sheath for typical service entrance cable constructions is 31 mils.

Referring now to FIG. 4, an alternative embodiment is shown. A service entrance cable is illustrated having a pair of insulated conductors 12a and 14a surrounded by a helically wound spiral neutral conductor 16a, a Mylar tape 28a and a polyvinyl chloride jacket 22a . In this embodiment the fiberglass tape 38 is in the form of a prewoven fiberglass cloth wound in a single lead helix having the trailing edge overlapping the leading edge of each preceding turn. The fiberglass tape in the illustrated embodiment is approximately 2 inches in width and 10 mils thick and is made up of 13 warp or longitudinal threads and 16 woof or transverse threads per inch. Of course, other widths, thicknesses and weaves may be alternatively employed, but these particular figures or parameters are preferably minimums. The fiberglass tape shown in FIG. 4 may be wound in single or double lead spiral and may be wound dry or may be provided with a latex base varnish sizing to improve lubricating qualities of the fiberglass tape. The lateral edges of the tape are preferably finished to void loose strands, but may be unfinished in some applications to reduce costs. In all other respects, the cable of FIG. 4 is similar to that described in detail with respect to FIGS. 1 and 2.

Figure 3:
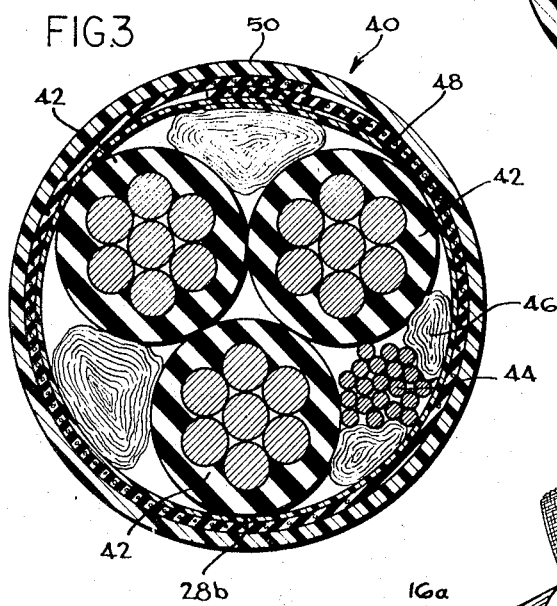
FIG. 3 is a sectional view of another embodiment of the present invention.

FIG. 3 illustrates the present invention employed in a round three conductor cable 40. In this embodiment, three insulated conductors 42 are positioned around the central axis of the cable in triangular fashion. A stranded neutral conductor 44 is placed in the groove formed between two of the insulated conductors 42. The remaining space formed between the insulated conductors is filled with insulative paper filling material 46 to form a bundle which is wrapped with a Mylar tape 28b similar to that employed in the other embodiments. A fiberglass tape 48 which may be either in the form of the tape 18 or the tape 38 is spirally wound onto the outer surface of the Mylar tape and the entire cable is encased in a jacket 50 of polyvinyl chloride or other suitable material resulting in a cable of circular profile having all the attributes of the present invention as described herein with respect to the two conductor cables.

As mentioned briefly earlier, the improved cable of the present invention results in a more efficient process for manufacturing service entrance cable. Referring again to FIG. 1, the cable is manufactured by forming the conductor bundle containing conductors 12, 14 and 16 in the same manner as is known in the prior art. The bundle may then be wrapped with the layer of Mylar tape by beans of conventional wrapping machines utilizing one or more spools mounted in satellite relationship and orbiting around the cable as it moves therethrough. This operation may be achieved in continuous fashion after the cable bundle is formed. After the Mylar tape is applied, the cable proceeds to a further station at which the fiberglass tape is applied in helical wrap by means of one, two, or more orbiting spools containing lengths of the tape 18 or 38. As mentioned earlier, the wrap of the tape 18 is applied so that each trailing edge 32 overlaps the preceding leading edge 30 resulting in a raised portion 34 where the tape is overlapped onto the conductor bundle. During this portion of the operation the cable is moving to the right as viewed in FIG. 1 and the wrapping is proceeding to the left. The cable then is wound on a storage reel until a complete length of the cable bundle has been formed with the fiberglass tape 18 in place.

In order to apply the polyvinyl chloride jacket, the storage reel is unwound and the cable is fed through the die of conventional plastic extrusion apparatus in the opposite direction from that in which the fiberglass tape is applied. Thus, as the cable is introduced into the extrusion die the unexposed leading edge 30 of each turn of the tape is inserted through the die first and the exposed trailing edge 32 and the raised portion 34 resulting from the overlap enter the die last. By employing this technique, opportunities for the free edge 32 to snag on the extrusion die and cause the disruption of the fiberglass sheath are avoided.

The process thus results in a more economical and high speed production of service entrance cables with a minimum of shutdown time and a maximum reliability with regard to quality. The polyvinyl chloride jacket can be applied to close tolerances without danger of snagging of the fiberglass sheath on the face of the extrusion die thus avoiding costly shutdown time and the destruction of partially finished cable. At the same time, the slowest step of manufacture of prior art cables has been eliminated—that of braiding the fiberglass sheath onto the outer surface of the Mylar tape. Moreover, these new service entrance cables made according to the present invention comply with the requirements of Underwriters' Laboratories, Inc. and their Standard for Service-Entrance Cables (UL 854), and are generally as resistant to mechanical damage as are listed cables of conventional construction. Thus, the results of U.L. tests have been found acceptable to the Underwriters Laboratories.

While the present invention has been illustrated and described with reference to particular embodiments, various other embodiments are clearly within the scope of the invention as defined by the appended claims. For example, other forms of prewoven or premade fiberglass tape may be employed in the cable embodiments illustrated, as well as in other forms of service entrance cable, such as two or four conductor round which are also commonly used for electric service.

What is claimed is:

1. A service entrance cable comprising a plurality of insulated conductors extending along the cable with their respective insulations in mutual contact, a bare neutral conductor disposed along said cable adjacent said insulated conductors, a helically wrapped sheath of preformed fiberglass tape of relatively uniform width surrounding said insulated conductors and said neutral conductor, said sheath being formed so that each turn of said tape overlaps a previous turn to form a continuous layer of tape, and a continuous extruded flexible jacket of polyvinyl chloride surrounding said fiberglass tape and being in nonadhering relation thereto, said tape comprising a synthetic rubberlike plastic formed by the polymerization of chloroprene.

2. A service entrance cable comprising a plurality of insulated conductors extending along the cable with their respective insulations in mutual contact, a bare neutral conductor disposed along said cable adjacent said insulated conductors, a helically wrapped sheath of preformed fiberglass tape of relatively uniform width surrounding said insulated conductors and said neutral conductor, said sheath being formed so that each turn of said tape overlaps a previous turn to form a continuous layer of tape, and a continuous extruded flexible jacket of polyvinyl chloride surrounding said fiberglass tape and being in nonadhering relation thereto, said tape comprising a prewoven fiberglass cloth having at least 13 warp threads and at least 16 woof threads per inch.

3. A service entrance cable as set forth in claim 2 wherein said fiberglass cloth is at least 10 mils thick.

4. A service entrance cable as set forth in claim 1 wherein said sheath of fiberglass tape is formed from a double lead helix comprising two separate tapes.

5. A service entrance cable as set forth in claim 2 wherein said fiberglass tape is coated with a lubricating sizing.

* * * * *